W. J. DUDLEY.
POULTRY FEEDER.
APPLICATION FILED APR. 10, 1916.
1,189,547.
Patented July 4, 1916.
2 SHEETS—SHEET 1.
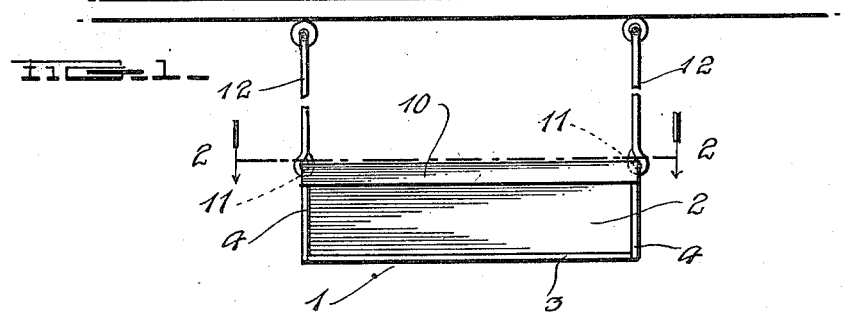
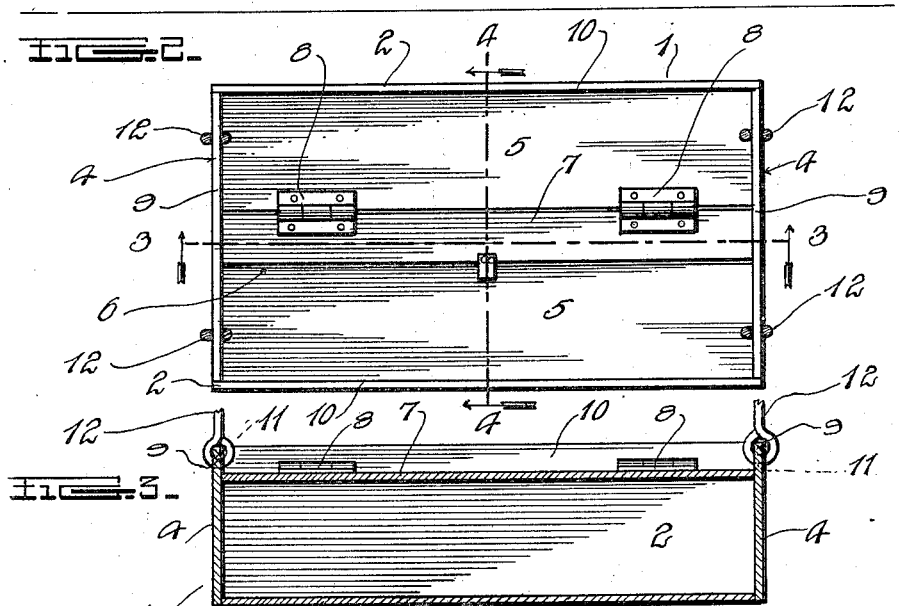
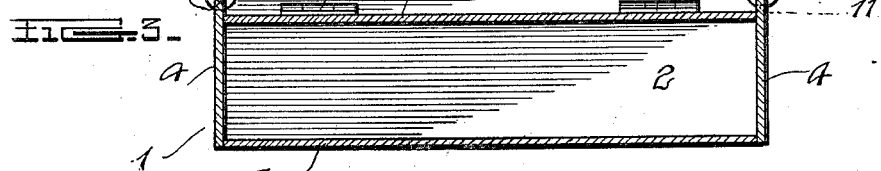
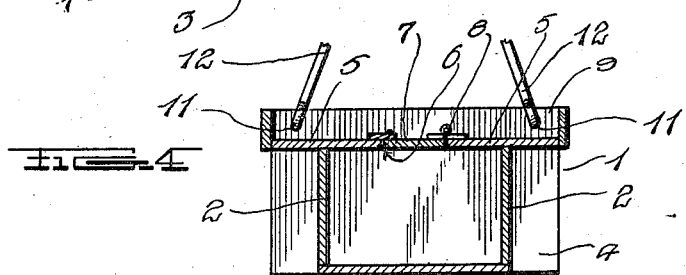
Witnesses
George W. Giovannietti
Inventor
W. J. Dudley
by H. R. Willson &co.
Attorneys

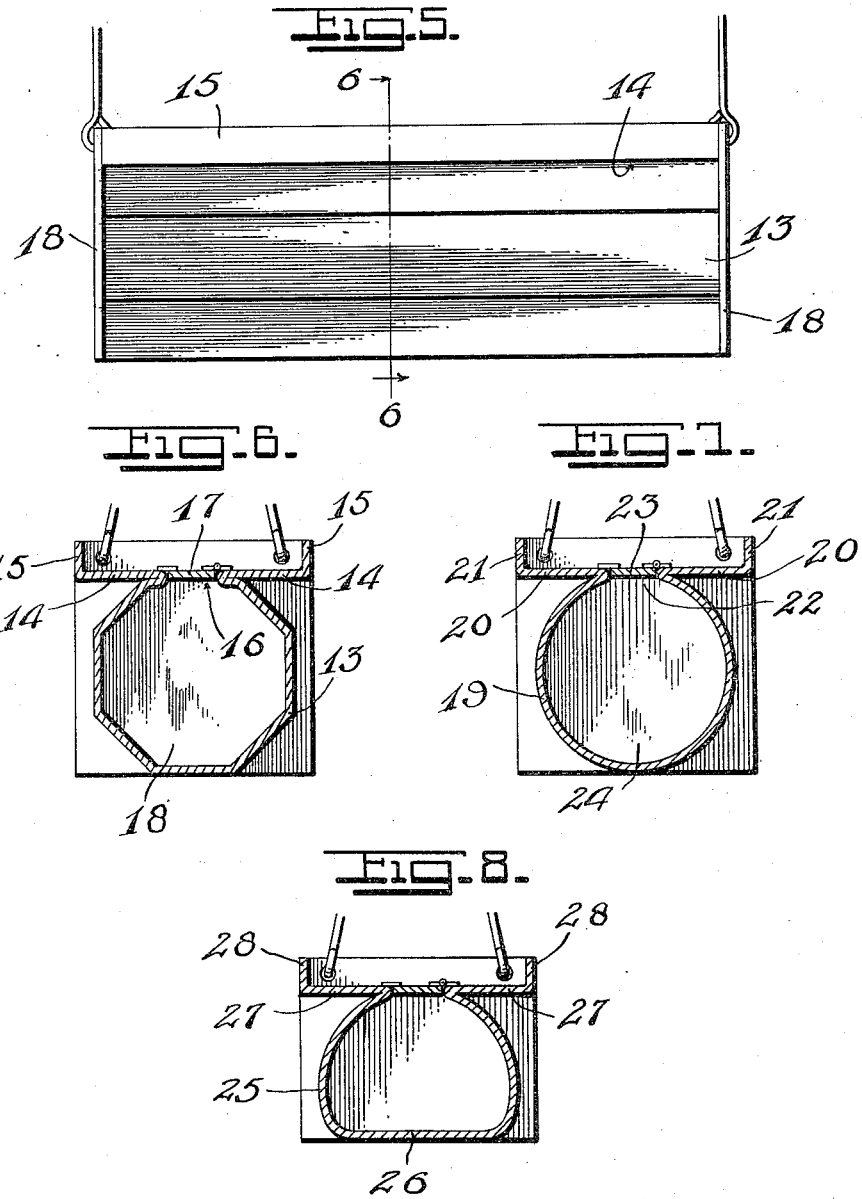

UNITED STATES PATENT OFFICE.

WILLIAM JENKS DUDLEY, OF WILMINGTON, OHIO.

POULTRY-FEEDER.

1,189,547.  Specification of Letters Patent.  Patented July 4, 1916.

Application filed April 10, 1916. Serial No. 90,150.

*To all whom it may concern:*

Be it known that I, WILLIAM JENKS DUDLEY, a citizen of the United States, residing at Wilmington, in the county of Clinton and State of Ohio, have invented certain new and useful Improvements in Poultry-Feeders; and I do declare the following to be a full, clear, and exact description of the invention, such as will enable others skilled in the art to which it appertains to make and use the same.

This invention relates to improvements in feeders for poultry and the like, and has for its principal object to provide a simply constructed device of this character which will be rat and mouse proof.

An additional object of the invention is to provide a device from which the feed cannot be readily scratched by the fowls and thus prevent loss of the same.

With the above and many other objects in view, the invention resides in the novel features of construction, combination and arrangement of parts which will hereinafter be more particularly described and claimed, and shown in the drawings wherein:

Figure 1 represents a side elevation of my improved feeder; Fig. 2 is a horizontal section taken on the line 2—2 of Fig. 1; Fig. 3 is a vertical longitudinal section taken on the line 3—3 of Fig. 2; Fig. 4 is a vertical transverse section taken on the line 4—4 of Fig. 2; Fig. 5 is a side elevation of a feeder constructed in a slightly different manner from those shown in the preceding figures; Fig. 6 is a vertical transverse section taken on the line 6—6 of Fig. 5; and Figs. 7 and 8 are similar views showing still other forms of feeders.

In its preferred embodiment, my invention comprises broadly a feed hopper which is adapted to be supported about two and one-half or three feet above the floor by any preferred means in order that the fowls may readily feed therefrom while rats, mice and the like will be prevented from gaining access to the contents of the feeder. The feed is contained in a trough 1 which is formed by the side members 2 and the bottom 3 which is secured to the lower edges of said members, the ends of this trough being closed by the end members 4 as shown. The members 2 and the bottom 3 are preferably formed from single strips of metal or wood of any preferred or desired length, depending upon the size of the feeder to be constructed. The end members 4 are also preferably formed from single pieces of sheet metal somewhat larger in size than the cross sectional dimensions of the trough 1.

Flange members 5 are secured to the upper edges of the side members 2 and project laterally outward beyond the same to form platforms upon which the fowls may stand when feeding from the trough. The inner adjacent edges of these platforms or flange members 5 are spaced apart a slight distance, preferably two and one-half or three inches to provide an elongated entrance slot 6 into the interior of the trough 1 into which it is necessary for the poultry to place their heads when they desire to feed. This slot 6 is closed by a suitable door or lid 7 when it is desired to prevent the fowls from feeding, this door being hinged to one edge of one of the platforms 5 as shown at 8 so that it can be folded back thereupon to open the entrance into the trough.

The upper edges of the end members 4 project above the top of the platforms 5 to form flanges 9 which coact with the additional flanges 10 which are secured to the side edges of the platforms to prevent any feed which is forced from the trough from falling onto the ground. In this manner, any grain or other feed which is hooked out of the trough or drops from the fowls' bills, can be readily pushed back into the trough, the flanges preventing it from dropping to the ground and becoming lost.

The flanges 9 are apertured as shown at 11 adjacent the outer ends thereof to receive the lower ends of supporting wires or the like 12 by which the feeder may be supported to the rafters of the chicken house or other suitable supports. This feeder is preferably spaced above the floor a suitable distance to prevent rats and mice from jumping thereupon and obtaining food from the trough, the fowls, however, being enabled to readily fly upon the feeder at any time. In this way, the poultry can be very easily fed at any time without the danger of rats and other rodents obtaining a large portion of the food. Furthermore, because of the narrowness of the slot 6, horses and other stock will also be prevented from gaining access to the feed in the trough. By making the slot very narrow, the chickens will be prevented from scratching or hooking grain or other feed from the trough and thus scattering it about.

It has been found that when the entrances to feed containers are very small so as to prevent scattering of feed, the fowls' combs would prevent their obtaining food, and also the combs would often be injured or torn. However, with a feeder such as heretofore described, a fowl can readily obtain food therefrom without danger of injury to its comb, since by straddling the slot, the fowl can easily insert its head through the narrow slot. This is also true of the feeders illustrated in Figs. 5 to 8 which are constructed in a somewhat different manner from the feeder illustrated in the other figures, but embodying the same features. The forms illustrated in these last mentioned figures are constructed of light galvanized sheet metal, the main portions including the feed hopper and the flanges upon which the fowls stand while feeding, being constructed of single sheets of metal of proper length. In Figs. 5 and 6 the trough or feed hopper 13 is formed of a single sheet of metal bent into substantially octagon shape in cross section, the adjacent edges of the sheet being then bent laterally outward in opposite directions in a horizontal plane to form flanges 14 upon which the fowls stand when feeding from the hopper. After these flanges or platforms are formed, their free edges are bent upwardly at right angles thereto to form flanges 15 which serve the same purpose as the flanges 10 in the first described form. The platforms 14 at their connections with the hopper 13 are spaced apart a distance of two and one-half or three inches to provide an elongated opening 16 which may be closed by a door 17 hinged to one of the platforms. The ends of this structure are closed by the end members 18 soldered or otherwise secured thereto. In Fig. 7, a feed hopper 19 is shown cylindrical in cross section and formed from a single sheet of metal, the longitudinal edges of which are bent laterally in opposite directions in the same horizontal plane to form platforms 20. It will be noted that the edges of the sheet of metal forming the hopper 19 are again bent after forming the platforms 20 to provide flanges 21. A longitudinally extending slot 22 is also formed by the platforms 20 in the top of the hopper in a manner similar to the other forms, which may be closed by the cover 23 hinged to one of said platforms. The ends of the trough and the platforms are closed by end members 24. In Fig. 8 still another sheet metal feeder is illustrated which is similar to the last described form except the bottom of the cylindrical hopper 25 is flattened as shown at 26. The hopper together with the platforms 27 and flanges 28 are also formed from a single sheet of metal in this case.

In addition to the advantages heretofore set forth, the feeder in its various forms may be used as a platform for a wet mash trough which is placed thereupon, the fowls being permitted to feed therefrom without having the mash polluted by refuse from the floor.

From the foregoing description, taken in connection with the accompanying drawings, it will be evident that I have invented an extremely simple, poultry feeder from which it will be impossible for the fowls to scatter grain or other food and from which it will be impossible for rats, mice and various other animals to obtain food.

Having thus described my invention, what I claim as new is:

1. A poultry feeder comprising a feed trough, a platform closing the upper side thereof and having a central longitudinal slot through which the fowls may insert their heads, said platform being adapted to serve as a perch for the fowls when feeding, and means for suspending the feeder from an overhead support at a level to prevent rats and mice from reaching the same, said means serving to swingingly support said feeder to permit jarring thereof by the fowls lighting on the platform, thus agitating the feed to prevent the latter from piling up along the sides of the trough.

2. A poultry feeder comprising a sheet of metal having its opposite side edge portions bent upwardly and inwardly to form a feed trough with a contracted inlet, said portions being bent horizontally outward in opposite directions from the outer edges of the trough to form a horizontal platform which serves as a perch upon which the fowls stand when feeding, the edges of said platform being bent upwardly to provide side flanges, end plates secured over the ends of said trough and extending above the platform to form end flanges coöperating with said side flanges to prevent the fowls from scattering feed from the platform, and means for suspending the feeder at a sufficient height to prevent rats and mice from reaching the same.

In testimony whereof I have hereunto set my hand in presence of two subscribing witnesses.

WILLIAM JENKS DUDLEY.

Witnesses:
F. P. BRIGHT,
W. I. STEWART.